US008878650B2

(12) United States Patent
Shin et al.

(10) Patent No.: US 8,878,650 B2
(45) Date of Patent: Nov. 4, 2014

(54) RFID SECURITY READER

(75) Inventors: Dong-Beom Shin, Daejeon (KR); Heyung Sub Lee, Daejeon (KR); Sang Yeoun Lee, Daejeon (KR); Hyunseok Kim, Jeonju-si (KR); Su Na Choi, Daejeon (KR); Kang Bok Lee, Daejeon (KR); Joo Sang Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 13/209,798

(22) Filed: Aug. 15, 2011

(65) Prior Publication Data

US 2012/0161933 A1 Jun. 28, 2012

(30) Foreign Application Priority Data

Dec. 23, 2010 (KR) .................. 10-2010-0133606

(51) Int. Cl.
*H04Q 5/22* (2006.01)
*H04L 9/06* (2006.01)
(52) U.S. Cl.
CPC ........... *H04L 9/0637* (2013.01); *H04L 2209/80* (2013.01)
USPC ............................................ 340/10.1
(58) Field of Classification Search
USPC ............................................. 340/10.1
See application file for complete search history.

(56) References Cited

U.S. PATENT DOCUMENTS

| 7,369,870 | B2 * | 5/2008 | Sakoda et al. | 455/522 |
| 7,979,909 | B2 * | 7/2011 | Jancula et al. | 726/26 |
| 2007/0069852 | A1 | 3/2007 | Mo et al. | |
| 2008/0144787 | A1 * | 6/2008 | Gantman et al. | 379/93.03 |
| 2010/0014673 | A1 * | 1/2010 | Lee et al. | 380/270 |
| 2010/0017617 | A1 * | 1/2010 | Lee et al. | 713/185 |
| 2010/0019883 | A1 * | 1/2010 | Eom et al. | 340/10.1 |
| 2010/0066505 | A1 * | 3/2010 | Shiotsu et al. | 340/10.3 |
| 2010/0141387 | A1 * | 6/2010 | Kosaka | 340/10.1 |

FOREIGN PATENT DOCUMENTS

| EP | 2 038 807 B1 | 12/2010 |
| KR | 10-0738329 | 5/2007 |
| KR | 10-2010-0010010 | 1/2010 |
| KR | 10-2010-0055707 | 5/2010 |

* cited by examiner

*Primary Examiner* — Jennifer Mehmood
*Assistant Examiner* — Omar Casillashernandez
(74) *Attorney, Agent, or Firm* — Staas & Halsey LLP

(57) ABSTRACT

In a radio frequency identification (RFID) security reader, by integrating an encryption module that encrypts transmission data and a decryption module that decrypts reception data from an RFID security tag to restore the reception data to original data to a modem, an input/output time period of a processor module that processes a communication protocol in an RFID security system is minimized.

10 Claims, 10 Drawing Sheets

RFID SECURITY READER

CROSS-REFERENCE TO RELATED APPLICATION

This application claims priority to and the benefit of Korean Patent Application No. 10-2010-0133606 filed in the Korean Intellectual Property Office on Dec. 23, 2010, the entire contents of which are incorporated herein by reference.

BACKGROUND OF THE INVENTION (a) Field of the Invention

The present invention relates to a radio frequency identification (RFID) security reader.

(b) Description of the Related Art

Currently, in various fields such as circulation/distribution, RFID technology is applied, but when using RFID technology, a security problem such as privacy infringement and illegal reproduction arises. Particularly, in an RFID application service requiring a high degree of safety and reliability such as medicine circulation, genuine determination of a costly article, and health care, a security issue arises as an important problem.

In order to solve a security issue in RFID technology, various researches are performed, and one of various researches is to apply security technology to RFID technology. That is, encryption communication is performed in a wireless interval between an RFID reader and an RFID tag.

In order to support encryption communication in a wireless interval between an RFID reader and an RFID tag, it is essentially required to apply an encryption function to the RFID reader. An encryption function of the RFID reader can be embodied by a software security engine and a hardware security engine according to an implementation method.

The RFID reader includes a processor module for protocol processing and interlocking with an upper level network, and by driving a software security engine in the processor module, an encryption function can be easily embodied in the RFID reader. However, the software security engine requires much computing time for encryption. Alternatively, it is difficult to integrate the hardware security engine to the RFID reader, but the hardware security engine can provide a quick reply time.

In general, an RFID reader provides encryption communication in a wireless interval using a software security engine, but much computing time for encryption is required and thus the RFID reader cannot transmit information to an RFID tag within a predetermined time period in a high speed communication mode. Therefore, security technology of an RFID tag that can transmit information to an RFID reader even in a high speed communication mode is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an RFID security reader having advantages of being capable of transmitting information to an RFID tag even in a high speed communication mode.

An exemplary embodiment of the present invention provides an RFID security reader that communicates with an RFID security tag that supports a security function. The RFID security reader includes a processor module, a modem, and a transmitting/receiving module. The processor module processes a security protocol and forms transmission data to transmit to the RFID security tag. The modem includes an encryption module that encrypts the transmission data and a decryption module that decrypts reception data from the RFID security tag and restores the reception data to original data, and processes and outputs data that are encrypted through the encryption module, processes the reception data, and outputs the reception data to the decryption module. The transmitting/receiving module processes data that are output from the modem, transmits the data to the RFID security tag, processes reception data from the RFID security tag, and outputs the reception data to the modem.

DETAILED DESCRIPTION OF THE EMBODIMENTS

Figure 1:
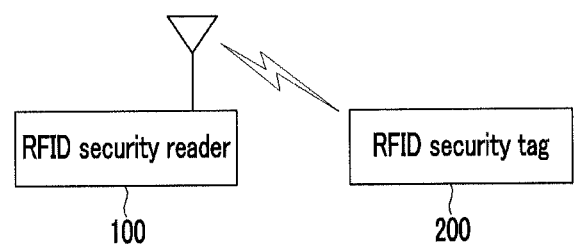
FIG. 1 is a diagram illustrating an RFID security system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, an RFID security reader according to an exemplary embodiment of the present invention will be described in detail with reference to the drawings.

FIG. 1 is a diagram illustrating an RFID security system according to an exemplary embodiment of the present invention.

Referring to FIG. 1, the RFID security system includes an RFID security reader 100 and an RFID security tag 200. Here, the RFID security reader 100 and the RFID security tag 200 may be an RFID reader and an RFID tag to which a security function is added.

The RFID security reader 100 and the RFID security tag 200 communicate with an ISO/IEC18000-6REV1 Type C-based communication protocol, which is an international standard, and can be operated in a general mode and a security mode.

When operating in a general mode, the RFID security reader 100 and the RFID security tag 200 support an inventory operation and all commands obey the ISO/IEC 18000-6REV1 Type C standard. The RFID security reader 100 requests tag information to the RFID security tag 200 through this process, and the RFID security tag 200 transmits tag information including a unique item identifier (UII) of a product to the RFID security reader 100. In a general mode, the RFID security tag 200 provides a UII to all RFID security readers 100.

When operating in a security mode, the RFID security reader 100 and the RFID security tag 200 support an inventory process and all commands obey a security protocol. In this case, the security protocol operates based on the ISO/IEC 18000-6REV1 Type C standard and the ISO/IEC/WD 29167-6 standard. In a security mode, the RFID security tag 200 encrypts a UII and provides the encrypted UII to the RFID security reader 100, and the RFID security reader 100 also encrypts transmission data and transmits the encrypted transmission data to the RFID security tag 200. Here, the transmission data may be a signal that requests tag information, and may be formed with a command and parameter data.

When the RFID security reader 100 receives RN16, which is a reception signal of the RFID security tag 200 according to a query command from the RFID security tag 200, the RFID security reader 100 transmits an ACK message of RN16 to the RFID security tag 200.

The RFID security tag 200 transmits a reply message of the ACK message to the RFID security reader 100. In this case, the RFID security tag 200 displays whether the RFID security tag 200 has a security function and a present operation mode thereof in a reply message.

As a method of notifying the RFID security reader 100 whether the RFID security tag 200 has a security function and a present operation mode, the RFID security tag 200 uses a data form of extended protocol control (XPC) in a standard. XPC is a value representing control information such as whether to apply a security function or a method of performing a protocol, is defined as a data structure for notifying an RFID reader of a support function (for example, a sensor support and a battery support) of an RFID tag, and is formed in 16 bits. XPC of a present ISO/IEC 18000-6REV1 Type C standard has an unused extra bit, and in a security protocol according to an exemplary embodiment of the present invention, information on whether the RFID security reader 100 has a security function is notified to the RFID security tag 200 using a specific bit of XPC.

Figure 5:
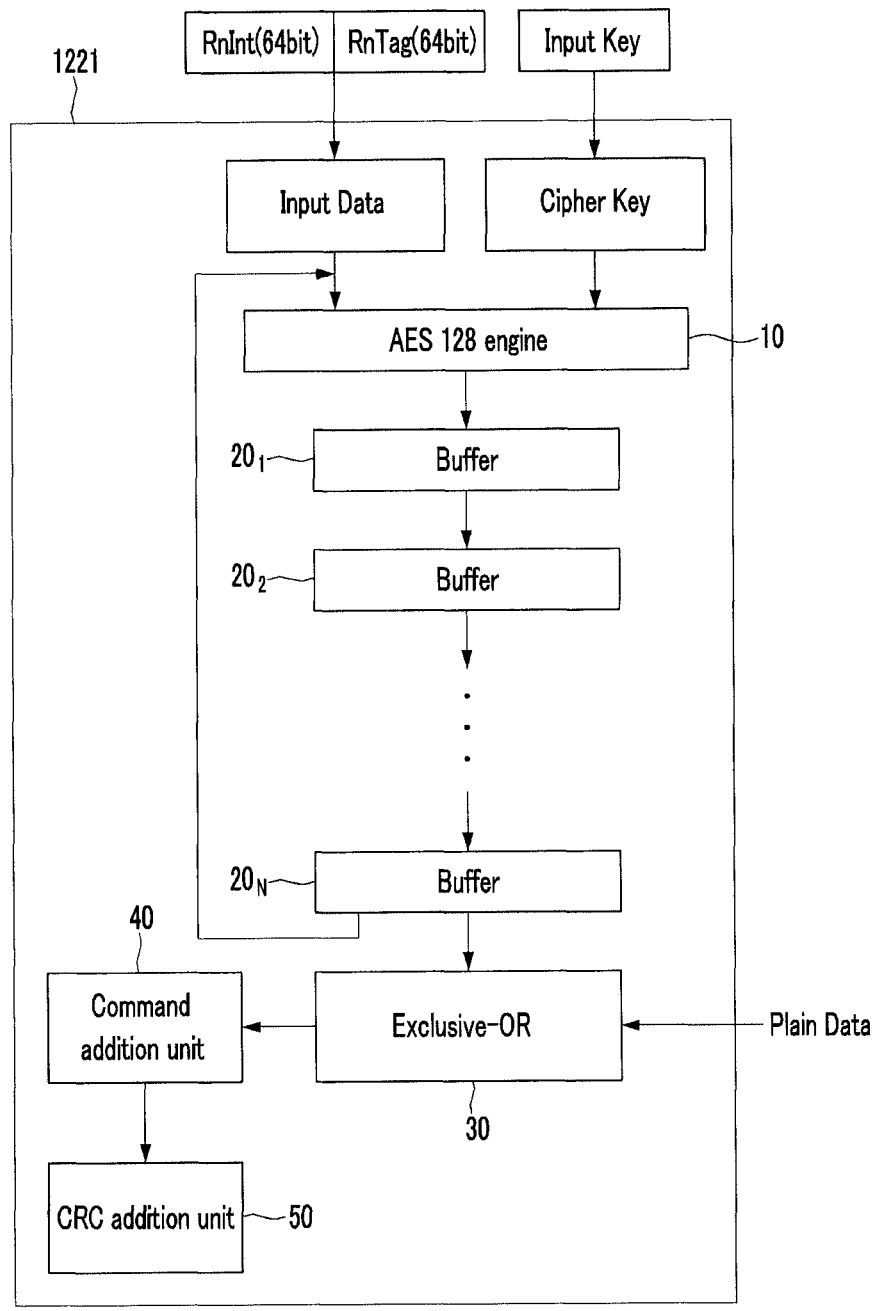
FIG. 5 is a diagram illustrating an encryption module of a security engine according to an exemplary embodiment of the present invention.

The RFID security reader 100 receives a reply message of the ACK message from the RFID security tag 200, and determines whether the RFID security tag 200 has a security function by parsing an XPC portion of the reply message. If the RFID security tag 200 has a security function, the RFID security reader 100 acquires an initial input value of a security engine through a security protocol procedure with the RFID security tag 200. As shown in FIG. 5, an initial input value of a security engine may include input data and a cipher key of 128 bits.

The RFID security reader 100 acquires a session key by inputting the input value to the security engine and encrypts data to transmit to the RFID security tag 200 using the session key.

Figure 2:
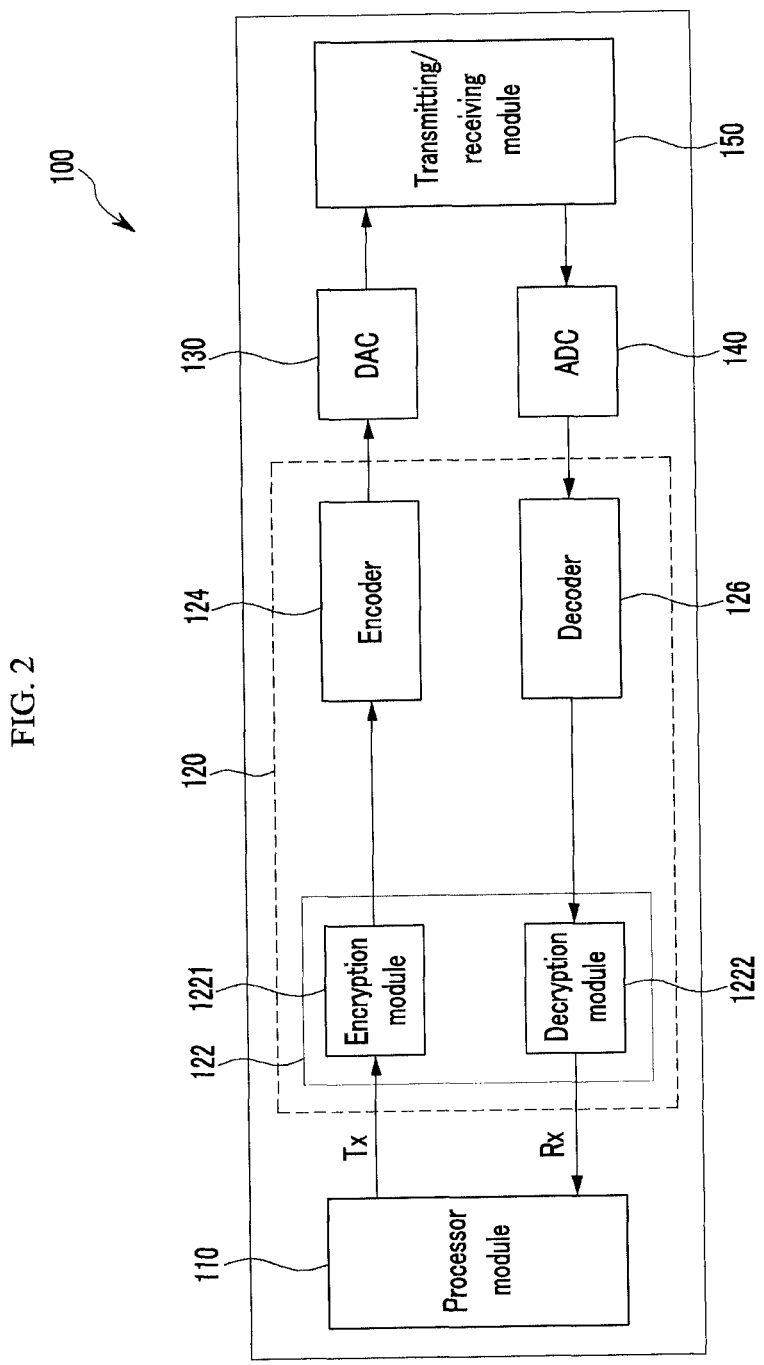
FIG. 2 is a diagram illustrating a configuration of an RFID security reader according to an exemplary embodiment of the present invention.

FIG. 2 is a diagram illustrating a configuration of an RFID security reader according to an exemplary embodiment of the present invention.

Referring to FIG. 2, the RFID security reader 100 includes a processor module 110, a modem 120, a digital-to-analog converter (DAC) 130, an analog-to-digital converter (ADC) 140, and a transmitting/receiving module 150.

The processor module 110 performs an ISO/IEC 18000-6REV1 Type C-based communication protocol and an ISO/IEC/WD 29167-6 standard-based communication protocol in a general mode, and performs a security protocol in a security mode. The processor module 110 forms transmission data Tx to transmit to the RFID security tag 200, transmits the transmission data Tx to the modem 120, and receives original data Rx of the RFID security tag 200 from the modem 120. In this case, the processor module 110 can transfer a size of a command together with the transmission data Tx to the modem 120. Further, the processor module 110 may transfer the entire size of the transmission data Tx together with the transmission data Tx to the modem 120.

The modem 120 includes a security engine 122, an encoder 124, and a decoder 126.

The security engine 122 includes an encryption module 1221 and a decryption module 1222. The encryption module 1221 encrypts the transmission data Tx, and the decryption module 1222 decrypts encrypted reception data and restores the decrypted reception data to original data Rx. As described above, the transmission data Tx include a command and parameter data, and the transmission data Tx and the original data Rx are plain data.

According to an exemplary embodiment of the present invention, the encryption module 1221 may encrypt both a command and parameter data, or only parameter data. The encryption module 1221 may separate and encrypt only parameter data from the transmission data Tx through the size of the command that it receives from the processor module 110.

The encoder 124 encodes the encrypted transmission data in a form that is defined by a standard and outputs the encoded transmission data to the DAC 130.

In an ISO/IEC 18000-6REV1 Type C-based communication protocol, the encoder 124 may use a pulse interval encoding (PIE) scheme.

The decoder 126 decodes reception data that are input through the transmitting/receiving module 150 and outputs the decoded reception data to the decryption module 1222.

The DAC 130 converts transmission data that are output from the encoder 124 from a digital signal to an analog signal and outputs the converted transmission data to the transmitting/receiving module 150.

The transmitting/receiving module 150 converts a frequency of output data of an analog form of the DAC 130, which is a baseband signal, and transmits the output data to the RFID security tag 200, and converts a frequency of encrypted reception data that are received from the RFID security tag 200 to a baseband signal and outputs the reception data to the ADC 140.

The ADC 140 converts reception data that are output from the transmitting/receiving module 150 from an analog signal to a digital signal and outputs the converted reception data to the decoder 126 of the modem 120.

A method of processing transmission data Tx and reception data in the modem 120 of the RFID security reader 100 will be described with reference to FIGS. 3 and 4.

Figure 3:
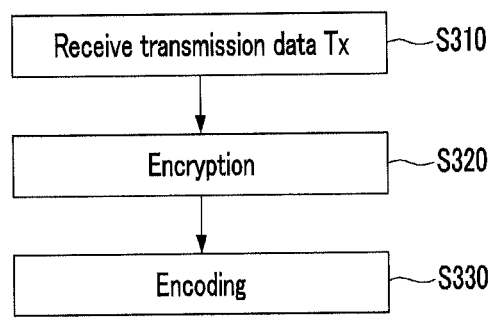
FIG. 3 is a flowchart illustrating a method of processing transmission data in a modem of an RFID security reader according to an exemplary embodiment of the present invention.
Figure 4:
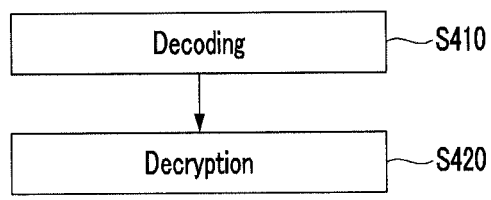
FIG. 4 is a flowchart illustrating a method of processing reception data in a modem of an RFID security reader according to an exemplary embodiment of the present invention.

FIG. 3 is a flowchart illustrating a method of processing transmission data in a modem of an RFID security reader according to an exemplary embodiment of the present invention, and FIG. 4 is a flowchart illustrating a method of processing reception data in a modem of an RFID security reader according to an exemplary embodiment of the present invention.

Referring to FIG. 3, when the encryption module 1221 of the security engine 122 receives transmission data Tx to transmit from the processor module 110 to the RFID security tag 200 (S310), the encryption module 1221 encrypts the transmission data Tx using a previously prepared cipher code and outputs the encrypted transmission data Tx to the encoder 124 (S320).

The encoder 124 encodes output data from the encryption module 1221 with a predetermined encoding scheme and outputs the encoded output data to the DAC 130 (S330).

The output data from the encoder 124 are converted from a digital signal to an analog signal via the DAC 130, and the analog signal is transmitted to the RFID security tag 200 via the transmitting/receiving module 150.

Next, referring to FIG. 4, the RFID security tag 200 encrypts transmission data to transmit to the RFID security reader 100 and transmits the encrypted transmission data to the RFID security reader 100.

The transmission data from the RFID security tag 200 are received in an encrypted form in the RFID security reader 100. The reception data are converted to a baseband signal through the transmitting/receiving module 150, and the reception data that are converted to the baseband signal are converted to a digital signal through the ADC 140 to be input to the decoder 126 of the modem 120.

The decoder 126 decodes output data of the ADC 140 and outputs the decoded output data to the decryption module 1222 of the security engine 122 (S410).

The decryption module 1222 decrypts the output data from the decoder 126 and restores the decrypted output data to plain data, i.e., original data Tx (S420). The original data Tx are transmission data before being encrypted in the RFID security tag 200.

Figure 6:
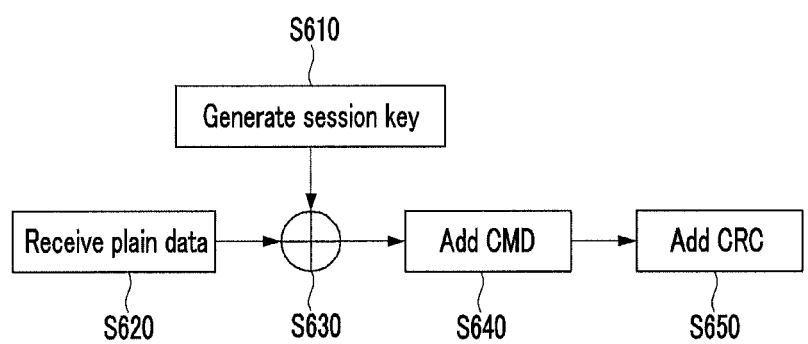
FIG. 6 is a flowchart illustrating a method of encrypting an encryption module of a security engine according to an exemplary embodiment of the present invention.
Figure 7:
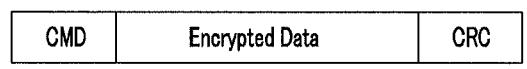
FIG. 7 is a diagram illustrating output data of an encryption module of a security engine.

FIG. 5 is a diagram illustrating an encryption module of a security engine according to an exemplary embodiment of the present invention, FIG. 6 is a flowchart illustrating a method of encrypting an encryption module of a security engine according to an exemplary embodiment of the present invention, and FIG. 7 is a diagram illustrating output data of an encryption module of a security engine.

Referring to FIG. 5, the encryption module 1221 of the security engine 122 includes an advanced encryption standard (AES) 128 engine 10, a plurality of buffers $20_1$-$20_N$, an exclusive-OR 30, a command addition unit 40, and a cyclic redundancy check (CRC) addition unit 50.

The AES 128 engine 10 is driven with an OFB scheme.

Referring to FIG. 6, the AES 128 engine 10 receives input data of 128 bits and a cipher key of 128 bits as an initial input value, generates a session key of 128 bits using the input data and the cipher key, and outputs the session key to the buffer $20_1$ (S610).

The buffers $20_1$-$20_N$ are sequentially connected, the buffer $20_1$ is connected to the AES 128 engine 10, and the buffer $20_N$ is connected to the exclusive-OR 30.

The buffers $20_1$-$20_N$ can store data of a 128 bit size, and when a corresponding buffer is empty by outputting a session key, the corresponding buffer receives a session key from an immediately preceding buffer.

In order to shorten a reply time of the RFID security reader 100, the AES 128 engine 10 according to an exemplary embodiment of the present invention previously generates an extra session key and stores the extra session key in the buffers $20_1$-$20_N$, and the quantity of the buffers $20_1$-$20_N$ is determined according to the quantity of extra session keys. For example, when the quantity of extra session keys is 3, a firstly generated session key is stored in the buffer $20_3$, a secondly generated session key is stored in the buffer $20_2$, and a finally generated session key is stored in the buffer $20_1$. In this way, when an initial input value is determined, the AES 128 engine 10 previously generates and stores an extra session key, thereby minimizing a processing time period of an RFID security system.

Further, the AES 128 engine 10 according to an exemplary embodiment of the present invention generates an extra session key, then receives feedback of a session key that is output from the buffer $20_N$ and generates a session key using the feedback session key and cipher key.

The cipher key of 128 bits is generated using a key index that it receives from the RFID security tag 200. The RFID security reader 100 stores a key table (not shown), and the AES 128 engine 10 uses an input key of the same index as a key index of 128 bits of the presently communicating RFID security tag 200 as a cipher key using a key index that it receives from the RFID security tag 200. Input data of 128 bits are generated using random numbers RnInt and RnTag of 64 bits that are generated in each of the RFID security reader 100 and the RFID security tag 200.

The exclusive-OR 30 receives a session key and plain data that are output from the buffer $20_N$ (S620), and the exclusive-OR 30 performs an exclusive OR operation of the received plain data and session key in a bit unit and outputs the received plain data and session key to the command addition unit 40 (S630). Here, the plain data are transmission data Tx, and data in which an exclusive OR operation is performed become encrypted data.

The command addition unit 40 adds a command (CMD) for communication with the RFID security tag 200 to a front portion of the encrypted data, and outputs the encrypted data to the CRC addition unit 50 (S640).

The CRC addition unit 50 performs a CRC operation of the encrypted data, generates an error detection code CRC-16 of 16 bits corresponding to an operation result, adds the error detection code CRC-16 to a rear portion of the encrypted data, and outputs the encrypted data to the encoder 124 (S650).

That is, as shown in FIG. 7, output data of the encryption module 1221 of the security engine 122 include a CMD field in which a CMD is loaded, an encrypted data field in which encrypted data are loaded, and a CRC field in which the CRC-16 is loaded, and an encryption area is an encrypted data field.

The AES 128 engine 10 may encrypt both transmission data Tx and a CMD. In this case, the transmission data Tx and the CMD can be used as plain data. In this way, when both the transmission data Tx and the CMD are encrypted, output data of the encryption module 1221 of the security engine 122 have the same structure as that of output data of FIG. 7, but an encryption area includes a CMD field and an encrypted data field.

Figure 8:
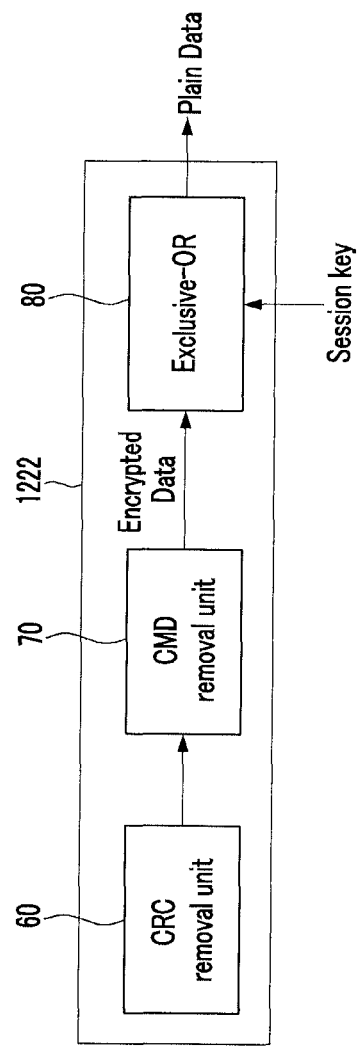
FIGS. 8 and 9 are diagrams illustrating a decryption module of a security engine according to first and second exemplary embodiments, respectively, of the present invention.

In this way, according to an exemplary embodiment of the present invention, an extra session key is generated and stored in the buffers $20_1$-$20_N$, and the AES 128 engine 10 again receives feedback of a session key that is output from the buffer $20_N$ as input data and operates. In this case, when the encryption module 1221 is formed with hardware and is integrated with the modem 120, automatic feedback can be performed and thus an input/output time period between the processor module 110 and the modem 120 can be minimized. Therefore, the RFID security reader 100 can perform encryption communication with the RFID security tag 200 in a high speed communication mode. FIG. 8 is a diagram illustrating a decryption module of a security engine according to a first exemplary embodiment of the present invention.

Referring to FIG. 8, the decryption module 1222 includes a CRC removal unit 60, a CMD removal unit 70, and an exclusive-OR 80.

The CRC removal unit 60 determines a CRC field of data that are input to the decryption module 1222, and if the CRC field has no error, the CRC removal unit 60 removes CRC-16 and outputs the data to the CMD removal unit 70.

The CMD removal unit 70 determines a CMD field of the input data, removes a CMD, and outputs the data to the exclusive-OR 80.

The exclusive-OR 80 performs an exclusive OR operation of encrypted data that are output from the CMD removal unit 70 and a session key of 128 bits in a bit unit, and restores the data and the session key to plain data.

When a CMD is not encrypted, a peripheral malicious RFID reader can know a present state of the RFID security tag 200 by parsing the CMD. For this reason, the RFID security tag 100 can even encrypt a CMD.

Figure 9:
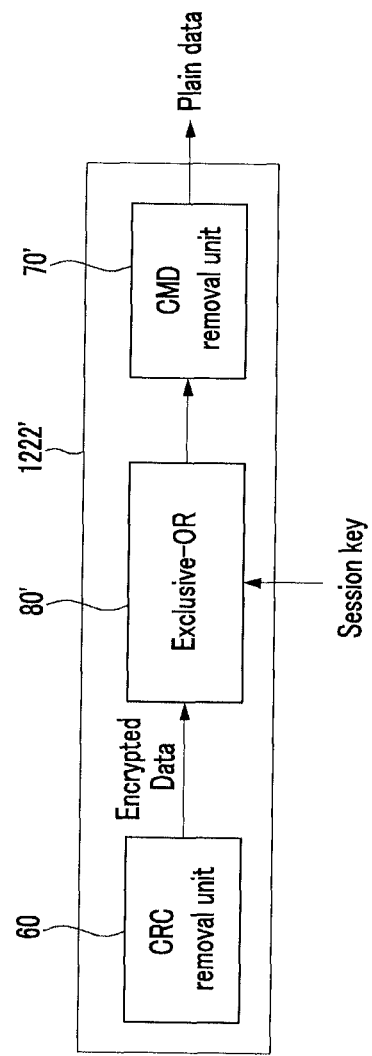

In this case, a decryption module 1222' may be formed, as shown in FIG. 9.

FIG. 9 is a diagram illustrating a decryption module of a security engine according to a second exemplary embodiment of the present invention.

Referring to FIG. 9, the decryption module 1222' includes a CRC removal unit 60, an exclusive-OR 80', and a CMD removal unit 70'.

When a CMD and transmission data of the RFID security tag 200 are encrypted, an encryption area is a CMD field and an encrypted data field, and thus the exclusive-OR 80' is positioned after the CRC removal unit 60.

The exclusive-OR 80' decrypts encrypted data by performing an exclusive OR operation and outputs the decrypted data to the CMD removal unit 70'.

The CMD removal unit 70' determines a CMD field in the decrypted data from the exclusive-OR 80', removes a CMD, and restores original data.

Figure 10:
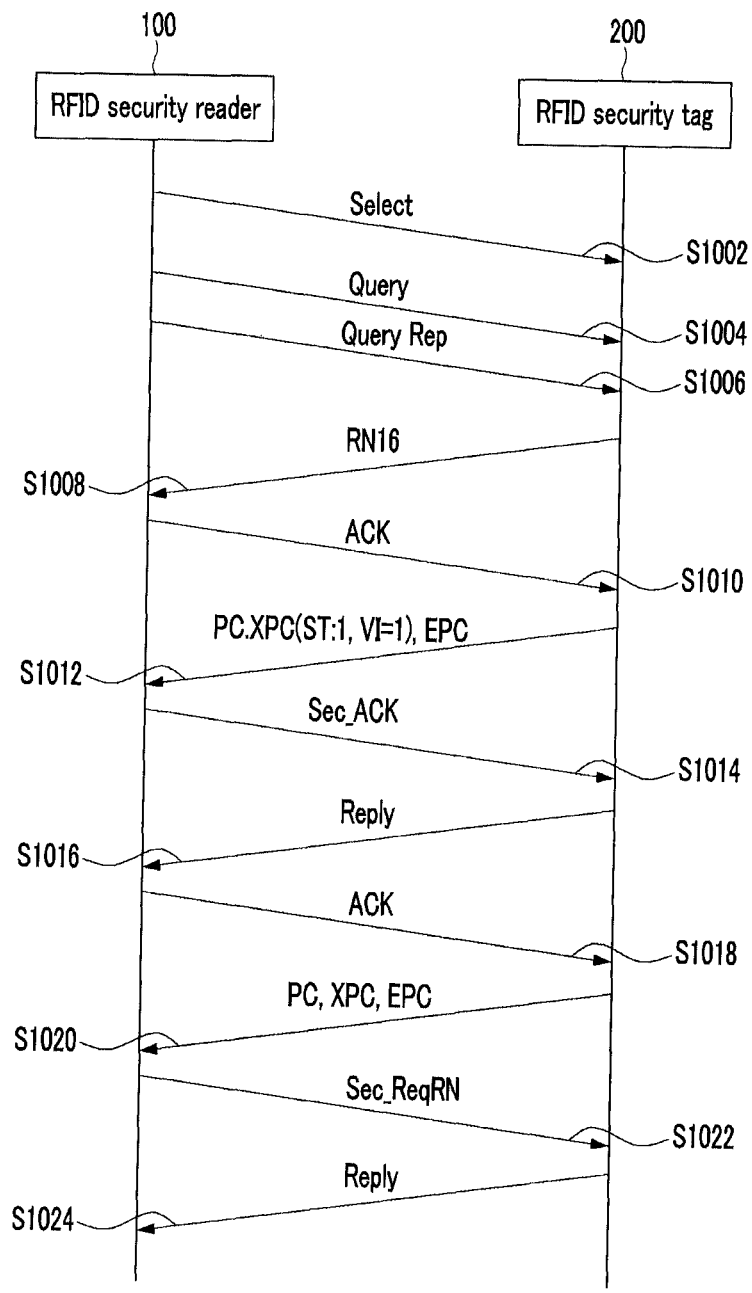
FIG. 10 is a flowchart illustrating an inventory process of a security protocol according to an exemplary embodiment of the present invention.

FIG. 10 is a flowchart illustrating an inventory process of a security protocol according to an exemplary embodiment of the present invention.

Referring to FIG. 10, the RFID security reader 100 generates a select CMD and transmits the select CMD to tags in an inventory round (S1002). The RFID security tag 200 randomly selects a specific time slot.

The RFID security tag 200, having received the selected CMD, prepares operation and sustains a ready state until receiving a query and query rep CMDs.

Next, the RFID security reader 100 transmits a query and query rep CMDs to the RFID security tag 200 (S1004, S1006).

When a slot counter value becomes 0, the RFID security tag 200, having received the query and query rep CMDs, transmits a time slot that selects a random number value RN16 of 16 bits to the RFID security reader 100 (S1008).

The RFID security reader 100, having successfully received a random number value RN16,' transmits an ACK message including a random number value RN16 to the RFID security tag 200 (S1010), the RFID security tag 200 transmits a protocol control (PC), an XPC, and an electronic product code (EPC) to the RFID security reader 100 (S1012). Here, the RFID security tag 200 represents that the present RFID security tag 100 is a tag that supports a security function by setting an ST bit within the XPC to "1" and setting a VI bit to "1", and that a present operating state is a security mode. The RFID security tag 200 represents a state that supports a security function when an ST bit is "1" and a state that does not support a security function when an ST bit is "0", and represents a general mode when a VI bit is "0" and represents a security mode when a VI bit is "1". The EPC performs a function of notifying the RFID security reader 100 that the RFID security tag 200 presently operates in a security mode.

The EPC is a void EPC, and when an RFID reader having no security function receives an EPC, the RFID reader recognizes the EPC as an UII and terminates an inventory process. Thereafter, when the RFID security reader 100 tries to connect to the RFID security tag 200 using another standard CMD, the RFID security tag 200 that is set to a security mode ignores all other CMDs and terminates communication.

After receiving the PC, XPC, and EPC through an inventory process, in order to communicate with the RFID security tag 200 that is set to a security mode, the RFID security reader 100 transmits a Sec_ACK message to the RFID security tag 200 (S1014).

The RFID security tag 200, having received the Sec_ACK message, performs initialization of an encryption module (not shown).

After initializing an encryption module, the RFID security tag 200 transmits a reply message including security information that is related to present security to the RFID security reader 100 (S1016).

The RFID security reader 100 initializes the encryption module 1221 using security information that it receives from the RFID security tag 200 and transmits an ACK message to the RFID security tag 200 (S1018).

The RFID security tag 200, having received an ACK message, encrypts the PC, XPC, and EPC and transmits the encrypted PC, XPC, and EPC to the RFID security reader 100 (S1020).

The RFID security reader 100 restores the encrypted PC, XPC, and EPC to original data and determines the EPC.

Next, the RFID security reader 100 transmits a Sec_ReqRN CMD to the RFID security tag 200 (S1022), and the RFID security tag 200, having received the Sec_ReqRN CMD, authenticates the RFID security reader 100 and transmits a reply message of the Sec_ReqRN CMD to the RFID security reader 100 (S1024). The RFID security reader 100, having received a reply message, authenticates the RFID security tag 200.

The Sec_ReqRN CMD is used for mutual authentication between the RFID security reader 100 and the RFID security tag 200, and only when the Sec_ReqRN CMD has succeeded does the RFID security tag 200 terminate an inventory process by performing a state transition or performs another CMD obeying an ISO/IEC 18000-6REV1 Type C standard.

Specifically, in the Sec_ReqRN CMD, a parameter CH_int and a random number value RN16 are encrypted and included, and the RFID security tag 200, having received the Sec_ReqRN CMD, decrypts the CH_int and the random number value RN16 and determines the random number value RN16. The parameter CH_int is a parameter that is generated in the RFID security reader 100.

If the decrypted random number value RN16 is a normal value, the RFID security tag 200 transmits a reply message to the RFID security reader 100 (S1024), and if the decrypted random number value RN16 is not a normal value, the RFID security tag 200 terminates an inventory process.

If the decrypted random number value RN16 is a normal value, the RFID security tag 200 encrypts the CH_int and a randomly generated handle, and includes the encrypted CH_int and handle in the reply message. Here, the handle is used in all the following CMDs, similar to an ISO/IEC 18000-6REV1 Type C standard procedure.

The RFID security reader 100 decrypts the CH_int and the handle and compares the decrypted CH_int with a CH_int that is generated by the RFID security reader 100, and if the decrypted CH_int corresponds with a CH_int that is generated by the RFID security reader 100, the RFID security reader 100 authenticates a tag and continues to perform an inventory process, while if the decrypted CH_int does not correspond with a CH_int that is generated by the RFID security reader 100, the RFID security reader 100 terminates an inventory process.

That is, when a normal CH_int is received, an encryption process and a decryption process of all CMDs and reply data to be used later are performed through a security engine, and thus the RFID security reader 100 and the RFID security tag 200 perform communication only through an encryption channel.

According to an exemplary embodiment of the present invention, by integrating a security engine that is related to encryption to a modem of an RFID security reader, participation of software is minimized and thus the security engine can be operated with a high speed. Further, by minimizing an unnecessary read/write operation of a processor module, the RFID security reader can perform encryption communication with an RFID security tag in a high speed communication mode.

An exemplary embodiment of the present invention may be not only embodied through the above-described apparatus and/or method, but is also embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency identification (RFID) security reader that communicates with an RFID security tag that supports a security function, the RFID security reader comprising:
   a processor module that processes a security protocol and that forms transmission data to transmit to the RFID security tag;
   a modem that comprises an encryption module that encrypts the transmission data and a decryption module that decrypts reception data from the RFID security tag and restores the reception data to original data and an encoder that encodes and outputs the encrypted data, and a decoder that decodes the reception data and outputs the reception data to the decryption module; and
   a transmitting/receiving module that processes data that are output from the modem and transmits the data to the RFID security tag, processes reception data from the RFID security tag, and outputs the reception data to the modem,
   wherein the transmission data include a command and parameter data, and the encryption module generates encrypted data by encrypting the parameter data and adds the command at the front of the encrypted data, and
   wherein the processor module transfers the size information of the command together with the transmission data to the modem.

2. The RFID security reader of claim 1, wherein the transmission data comprises a command and parameter data, and the encryption module generates encrypted data by encrypting the parameter data and the command.

3. The RFID security reader of claim 1, wherein the encryption module performs a cyclic redundancy check (CRC) operation to the encrypted data and adds an error detection code of 16 bits corresponding to an operation result to the rear of the encrypted data.

4. The RFID security reader of claim 3, wherein the encryption module comprises:
   an engine that generates at least one session key using an initial input value; and
   an exclusive-OR that receives session keys one by one and that generates the encrypted data by performing an exclusive OR operation in a bit unit with data to encrypt and the session key.

5. The RFID security reader of claim 4, wherein the engine comprises an advanced encryption standard (AES) 128 engine that drives with an OFB scheme.

6. The RFID security reader of claim 2, wherein the encryption module performs a cyclic redundancy check (CRC) operation to the encrypted data and adds an error detection code of 16 bits corresponding to an operation result to the rear of the encrypted data.

7. The RFID security reader of claim 6, wherein the encryption module comprises:
   an engine that generates at least one session key using an initial input value; and
   an exclusive-OR that receives session keys one by one and that generates the encrypted data by performing an exclusive OR operation in a bit unit with data to encrypt and the session key.

8. The RFID security reader of claim 7, wherein the engine comprises an advanced encryption standard (AES) 128 engine that drives with an OFB scheme.

9. The RFID security reader of claim 1, wherein the decryption module comprises:
   a cyclic redundancy check (CRC) removal unit that checks a CRC of the reception data and removes an error detection code of the reception data;
   a command removal unit that removes a command from the reception data; and
   an exclusive-OR that performs an exclusive OR operation of a session key and encrypted data of the reception data in a bit unit and restores the encrypted data to original data.

10. The RFID security reader of claim 1, wherein the decryption module comprises:
    a cyclic redundancy check (CRC) removal unit that checks a CRC of the receive data and removes an error detection code of the receive data;
    an exclusive-OR that performs an exclusive OR operation of a session key and encrypted data of the reception data in a bit unit to restore the reception data; and
    a command removal unit that removes a command from the restored reception data.

* * * * *